US010917827B2

(12) United States Patent
Wu et al.

(10) Patent No.: US 10,917,827 B2
(45) Date of Patent: Feb. 9, 2021

(54) COMMUNICATION SYSTEM AND HEAD MOUNTED DISPLAY

(71) Applicant: HTC Corporation, Taoyuan (TW)

(72) Inventors: Chun-Yih Wu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/445,239

(22) Filed: Jun. 19, 2019

(65) Prior Publication Data

US 2020/0008121 A1 Jan. 2, 2020

Related U.S. Application Data

(60) Provisional application No. 62/686,692, filed on Jun. 19, 2018.

(51) Int. Cl.
| | | |
|---|---|---|
| H04W 36/30 | (2009.01) | |
| G02B 27/01 | (2006.01) | |
| G06F 3/01 | (2006.01) | |
| H04W 4/021 | (2018.01) | |
| H04W 36/08 | (2009.01) | |
| H04W 64/00 | (2009.01) | |

(52) U.S. Cl.
CPC .......... *H04W 36/30* (2013.01); *G02B 27/017* (2013.01); *G06F 3/012* (2013.01); *H04W 4/021* (2013.01); *H04W 36/08* (2013.01); *H04W 64/003* (2013.01)

(58) Field of Classification Search
CPC ..... H04W 36/30; H04W 4/021; H04W 36/08; H04W 64/003; G02B 7/017; G06F 3/012
See application file for complete search history.

(56) References Cited

U.S. PATENT DOCUMENTS

| | | | |
|---|---|---|---|
| 9,335,419 B2* | 5/2016 | Moeglein | .................. G01S 5/10 |
| 9,565,625 B1 | 2/2017 | MacNeille et al. | |
| 2013/0288704 A1 | 10/2013 | Wirola et al. | |
| 2015/0256980 A1 | 9/2015 | Ogale et al. | |
| 2016/0037427 A1* | 2/2016 | Lee | ........................ H04W 36/08 |
| | | | 455/437 |
| 2016/0226886 A1* | 8/2016 | Steiner | ...................... G01S 5/14 |

(Continued)

FOREIGN PATENT DOCUMENTS

| | | |
|---|---|---|
| CN | 107564106 | 1/2018 |
| CN | 108075784 | 5/2018 |
| TW | 201715476 | 5/2017 |

OTHER PUBLICATIONS

"Search Report of Europe Counterpart Application", dated Oct. 17, 2019, p. 1-p. 17.

(Continued)

*Primary Examiner* — Duc C Ho
(74) *Attorney, Agent, or Firm* — JCIPRNET

(57) ABSTRACT

The present disclosure provides a communication system and a head mounted display. The head mounted display is configured for: obtaining first geological information of the head mounted display at present based on a positioning technology; forwarding the first geological information to a base station through an access point; and in response to the head mounted display changing from the first geological information to second geological information, switching to a specific transmission mode according to a control signal from the base station.

20 Claims, 6 Drawing Sheets

(56) References Cited

U.S. PATENT DOCUMENTS

| | | |
|---|---|---|
| 2017/0134899 A1 | 5/2017 | Chan et al. |
| 2017/0223552 A1 | 8/2017 | Roy et al. |
| 2018/0046861 A1 | 2/2018 | Patel et al. |
| 2018/0113199 A1* | 4/2018 | Choi .................. G01S 1/70 |
| 2018/0279168 A1* | 9/2018 | Jheng ................. H04W 76/20 |

OTHER PUBLICATIONS

"Office Action of Taiwan Counterpart Application", dated Jun. 29, 2020, p. 1-p. 15.

* cited by examiner

COMMUNICATION SYSTEM AND HEAD MOUNTED DISPLAY

CROSS-REFERENCE TO RELATED APPLICATION

This application claims the priority benefit of U.S. provisional application Ser. No. 62/686,692, filed on Jun. 19, 2018. The entirety of the above-mentioned patent application is hereby incorporated by reference herein and made a part of specification.

TECHNICAL FIELD

The disclosure relates to a communication system and a head mounted display, and more particularly, to a communication system and a head mounted display for determining transmission mode based on location.

BACKGROUND

In a wireless communication system, a transmission mode (TM) or a handover (HO) decision of a base station and a user equipment is determined by practically performing a signal quality measurement. Taking an LTE system as an example, the base station evaluates a current overall state according to a hardware device capability of the user equipment and a reported channel state information (CSI) value, and accordingly determines a transmission mode suitable for the user equipment (by selecting the number of antennas, a signal modulation mode, a coding rate, a multiple input multiple output (MIMO) or a codebook of an array antenna). In addition, in the process of communication between the base station and the user equipment, if a reference signal receiving power (RSRP) reported by a measurement report (MR) of the user equipment is lower than a preset value for a certain period of time (e.g., a time to trigger; TTT) due to changes in a location of the user equipment or an external environment of the user equipment, a handover decision procedure is then triggered.

However, in the case of interactive video streaming based on edge computing (e.g., a cloud extended reality; XR), a tolerance latency for switching the communication is lower than a tolerance latency for voice or data transmission applications.

A positioning technology of six-degree-of-freedom (6DOF) is a basic specification of the XR generation. According to Wikipedia, six-degree-of-freedom refers to degrees of freedom of a rigid body moving in a three-dimension space. In particular, the rigid body can translate on three coordinate axes (forward/backward, up/down and left/right) perpendicular to one another, and can also rotate based on the three vertical axes. There are three rotation orientations known as pitch, yawl and roll. The user equipment of the XR generation can determine how to present the information of the interactive video and audio streaming according to the positioning and orientation information of six-degree-of-freedom.

Therefore, a more aggressive approach is needed to further reduce the latency of existing communication architectures to avoid a poor user experience due to the latency. For example, live video streaming viewed by a user may suffer significant delay or the like due to the latency of the user equipment.

SUMMARY

Accordingly, the disclosure provides a communication system for determining transmission mode based on location and a head mounted display, which are capable of solving the technical problems described above.

The disclosure provides a communication system for determining transmission mode based on location, which includes a plurality of access point, a base station and a user equipment. The access points are disposed within a specific field. The base station is connected to the access points and manages the access points. The base station receives a plurality of historical measurement reports and a plurality of historical sites corresponding thereto provided by the access points and creates a signal quality distribution map of the specific field according to the historical measurement reports and the historical sites. The signal quality distribution map includes a plurality of signal quality ranges, and each of the signal quality ranges corresponds to one of a plurality of transmission modes. The user equipment is located in the specific field, and served by a first access point among the access points. The base station is configured for: obtaining first geological information of the user equipment at present, and predicting second geological information of the user equipment based on the first geological information; in response to the first geological information and the second geological information respectively corresponding to a first signal quality range and a second signal quality range adjacent to each other among the signal quality ranges, obtaining a specific transmission mode corresponding to the second signal quality range from among the transmission modes; and in response to the user equipment changing from the first geological information to the second geological information, using a first control signal to control the user equipment to be switched to the specific transmission mode.

The disclosure provides a head mounted display, which is located in a specific field and served by a first access point in the specific field, and the first access point is managed by a base station. The head mounted display includes a positioning circuit, a transceiver circuit and a processor. The positioning circuit obtains first geological information of the head mounted display at present based on a positioning technology. The transceiver circuit forwards the first geological information to the base station via the first access point. The processor is coupled to the positioning circuit and the transceiver circuit, and configured for: in response to the head mounted display changing from the first geological information to second geological information, switching to a specific transmission mode according to a first control signal from the base station.

Based on the above, after obtaining the first geological information of the user equipment at present in the disclosure, the base station can accordingly predict the second geological information of the user equipment. If the first geological information and the second geological information correspond to the different signal quality ranges, the base station can find the specific transmission mode corresponding to the signal quality range to which the second geological information belongs in advance, and controls the user equipment to be switched to the specific transmission mode after moving to the second geological information. In this way, the latency of the user equipment when being switched to the transmission mode can be reduced so as to improve the performance of the user equipment.

To make the above features and advantages of the disclosure more comprehensible, several embodiments accompanied with drawings are described in detail as follows.

DETAILED DESCRIPTION

Figure 1A:
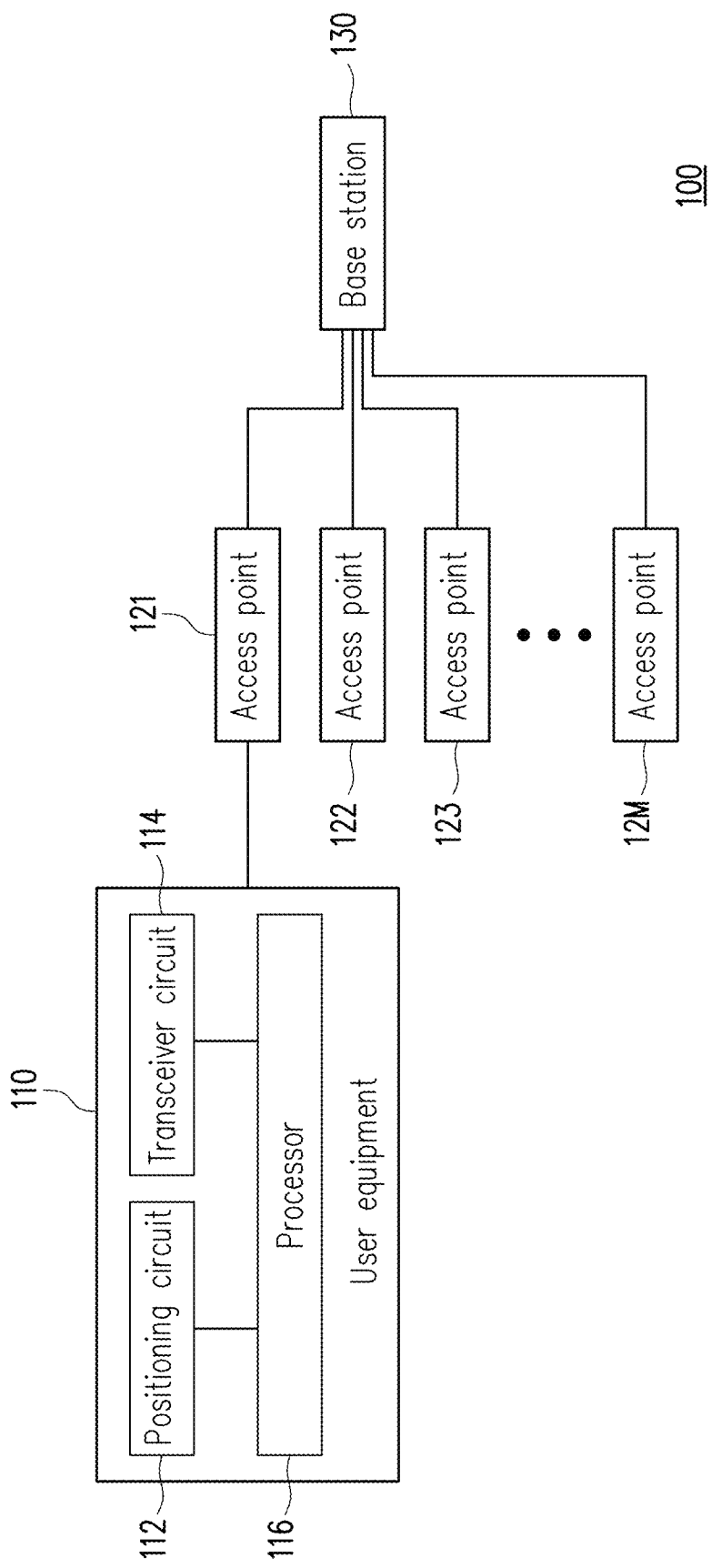
FIG. 1A is a schematic diagram illustrating a communication system according to an embodiment of the disclosure.
Figure 1B:
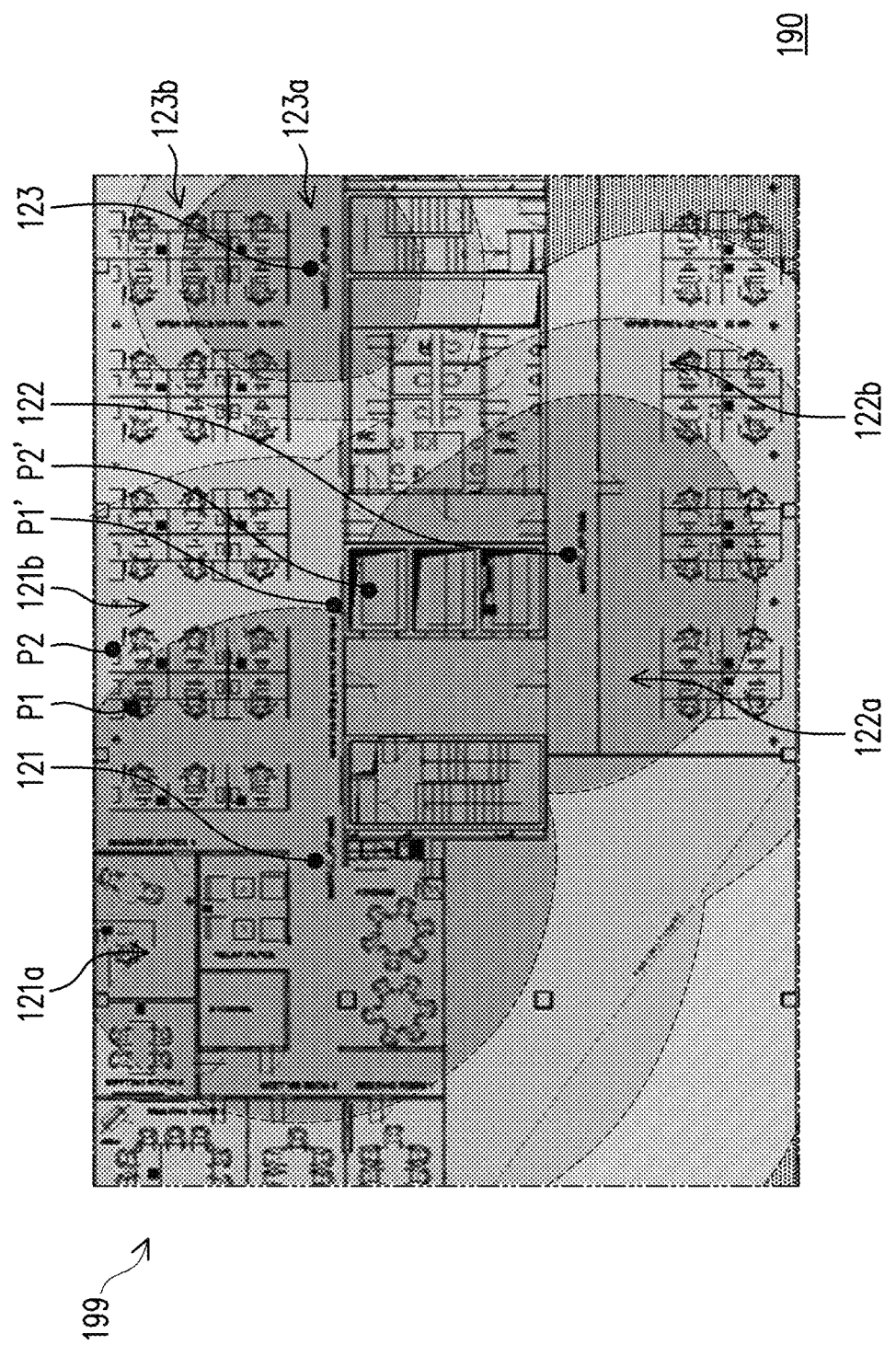
FIG. 1B illustrates a signal quality distribution map of a specific field according to FIG. 1A.

With reference to FIG. 1A and FIG. 1B, FIG. 1A is a schematic diagram illustrating a communication system according to an embodiment of the disclosure, and FIG. 1B illustrates a signal quality distribution map of a specific field according to FIG. 1A.

As shown by FIG. 1A, a communication system 100 includes a user equipment 110, access points (APs) 121 to 12M and a base station 130. In a different embodiment, the user equipment 110 may be a head mounted display (HMD) applied in an augmented reality, a virtual reality (VR) a hybrid reality (HR) or a cloud XR technology as well as a cell phone, a tablet computer, or other similar smart devices, but the disclosure is not limited thereto.

In this embodiment, the user equipment 110 can include a positioning circuit 112, a transceiver circuit 114 and a processor 116. In an embodiment, the positioning circuit 112 can obtain first geological information of the user equipment 110 at present based on a positioning technology.

Taking FIG. 1B as an example, the specific field 190 shown in the figure may be, for example, used to provide an interactive video and audio streaming based on an edge calculation, but the disclosure is not limited thereto. If the user equipment 110 is located in the specific field 190, the positioning circuit 112 may be used to obtain the first geological information of the user equipment 110 in the specific field 190 at present. In this embodiment of the disclosure, the first geological information may be a first location and/or a first orientation (e.g., a direction and an orientation of six-degree-of-freedom (6DOF)) of the user equipment 110 at present, but the disclosure is not limited thereto.

In an embodiment, the positioning circuit 112 is, for example, a GPS module, which may be used to obtain a GPS coordinate of the user equipment 110. In another embodiment, the positioning circuit 112 may obtain the first location of where the user equipment 110 currently be based on a Lighthouse technology. Specifically, one or more beacon transmitting devices for transmitting a beacon signal defined in the Lighthouse technology may be disposed in the specific field 190. In an embodiment, the beacon transmitting devices may be, for example, disposed on the access points 121 to 12M, but the disclosure is not limited thereto. In this case, the positioning circuit 112 can obtain the first location of where the user equipment 110 currently be based on the beacon signal transmitted by each of the beacon transmitting devices. Details regarding the Lighthouse technology described above may refer to the relevant literature, which would not be repeated hereinafter.

In another embodiment, a corresponding location tag may be disposed at each of a plurality of specific sites in the specific filed 190. In various embodiments, the location tag is, for example, a specific image for indicating the corresponding specific site such as a quick response (QR) code and the like, but the disclosure is not limited thereto. In this case, the positioning circuit 112 can include an image capturing device (e.g., a charge coupled device (CCD) lens, a complementary metal oxide semiconductor transistors (CMOS) lens and the like, but the disclosure is not limited thereto) so that the user equipment 110 can continuously capture images of the surrounding environment while moving around in the specific field 190. When a first location tag corresponding to a first specific site is captured by the image capturing device of the positioning device 112, the positioning circuit 112 can perform an image recognition operation on the first location tag and accordingly determine that the first location of the user equipment 110 is currently located on the first specific site, but the disclosure is not limited thereto.

In an embodiment, the positioning circuit 112 can include an inertial measurement unit (IMU), which can obtain the first location and the first orientation of the user equipment 110 based on an inertial navigation technology. In a different embodiment, the inertial measurement unit can include devices like an accelerometer, a magnetometer and a gyroscope. Details regarding the inertial navigation technology described above may refer to, but not limited to the following literatures: 1) Roienko et al, "*Data processing methods for mobile indoor navigation*". IEEE Second International Conference on Data Stream Mining & Processing, Aug. 21-25, 2018, Lviv, Ukraine. 2) Alizadeh, Ardalan; Kamalizad, Amir; and Silverman, Matt, "*WIRELESS AUGMENTED REALITY (AR)/VIRTUAL REALITY (VR) CHANNEL PREDICTION*", Technical Disclosure Commons, (Jun. 20, 2018). 3) Francis Baeka, Inhae Hab, Hyoungkwan Kimb, "*Augmented reality system for facility management using image-based indoor localization*", Automation in Construction 99 (2019) 18-2.

In an embodiment, the positioning circuit 112 may also adopt a magnetic tracking technology for positioning. Specifically, the positioning circuit 112 can include at least one magnetic force receiving coil. Also, a corresponding magnetic force transmitting coil may be disposed at each of one or more specific locations of the specific field 190. In this case, the positioning circuit 112 may determine the first location and the first orientation of the user equipment 110 at present based on a sensing relation between the magnetic force receiving coil and the magnetic force transmitting coil, but the disclosure is not limited thereto. In various embodiments, the inertial measurement unit can include devices like an accelerometer, a magnetometer and a gyroscope. Details regarding the inertial navigation technology described above may refer to, but not limited to the following literatures: Hu, C., Song, S., Wang, X., Meng, M. Q.-H., & Li, B. (2012). "*A Novel Positioning and Orientation System Based on Three Axis Magnetic Coils*". IEEE Transactions on Magnetics, 48(7), 2211-2219.

In FIG. 1A, the transceiver circuit 114 may be a component of the protocol unit which supports a global system for mobile communication (GSM), a personal handy-phone system (PHS), a code division multiple access (CDMA) system, a wireless fidelity (Wi-Fi) system or a worldwide interoperability for microwave access (WiMAX) signal transmission, but the disclosure is not limited thereto.

The transceiver circuit 114 also provides a wireless access for the user equipment 110 of FIG. 1A by using at least including (but not limited to) a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units and a local storage media component.

The transmitter circuit can include functional units for performing operations like low noise amplifying, impedance matching, frequency mixing, frequency down converting, filtering, amplifying and so on. The receiver circuit can include functional units for performing operations like amplifying, impedance matching, frequency mixing, frequency up converting, filtering, power amplifying and so on. The A/D converter or the D/A converter are configured to convert an analog signal format into a digital signal format during uplink signal processing, and convert the digital signal format into the analog signal format during downlink signal processing.

The processor 116 is coupled to the positioning circuit 112 and the transceiver circuit 1114, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In various embodiments, the base station 130 is, for example, an enhanced node B (eNodeB), an advanced base station (ABS), a macro-cell base station, a pico-cell base station, or a remote radio head (RRH), but the disclosure is not limited thereto.

In an embodiment, the base station 130 can receive a plurality of historical measurement reports and a plurality of historical sites corresponding thereto provided by the access points 121 to 12M and create a signal quality distribution map 199 of the specific field 190 according to the historical measurement reports and the historical sites. The historical measurement reports and the historical sites are provided by, for example, a plurality of first user equipments served by the access points 121 to 12M.

Taking the access point 121 and its served first user equipment as an example, when the access point 121 receives a first historical measurement report (which can include a signal quality, such as a reference symbol received power (RSRP) and the like) and a first historical site corresponding thereto, the access point 121 can provide the information to the base station 130. Accordingly, the base station 130 can learn of the signal quality corresponding to the first historical site in the specific field 190.

Moreover, as the number of the first user equipments providing the historical measurement reports and the corresponding historical locations increases, the base station 130 can learn of the signal quality of each site in the specific field 190 and accordingly create the signal quality distribution map 199.

As shown by FIG. 1B, the signal quality distribution map 199 can include a plurality of signal quality ranges 121a, 121b, 122a, 122b, 123a and 123b. In this embodiment, the base station 130 can firstly find the signal qualities in a certain range, and define the historical sites corresponding to the signal qualities together as one signal quality range. Taking the signal quality range 121a of FIG. 1B as an example, in its covered geographical range, the signal qualities of the sites may all be located in a first range. Taking the signal quality range 121b of FIG. 1B as another example, in its covered geographical range, the signal qualities of the sites may all be located in a second range.

Further, in view of FIG. 1B, since the signal quality ranges 121a and 121b are substantially centered on the access point 121 and the signal quality range 121b is farther from the access point 121, it is roughly known that the signal qualities in the signal quality range 121a should all be better than the signal qualities in the signal quality range 121b. Similarly, the signal qualities in the signal quality range 122a should all be better than the signal qualities in the signal quality range 122b, and the signal qualities in the signal quality range 123a should all be better than the signal qualities in the signal quality range 123b as well. However, the disclosure is not limited in this regard.

In the scenario of FIG. 1B, it is assumed that the signal qualities in the signal quality ranges 121a, 122a and 123a are all located in the first range, and are therefore marked with the same color. Similarly, it is also assumed in FIG. 1B that, the signal qualities in the signal quality ranges 121b, 122b and 123b are all located in the second range, and are therefore marked with the same color. However, the disclosure is not limited in this regard.

In an embodiment, the base station 130 can determine a corresponding transmission mode for each of the signal quality ranges 121a, 121b, 122a, 122b, 123a and 123b. For instance, since the signal qualities in the signal quality ranges 121a, 122a and 123a are better, the base station 130 can adopt a relatively high efficiency transmission mode as the transmission mode corresponding to the signal quality ranges 121a, 122a and 123a to provide a lower coding rate, a higher level signal modulation manner, more antennas, etc. On the other hand, since the signal qualities in the signal quality ranges 121b, 122b and 123b are worse, the base station 130 can adopt a relatively more robust transmission mode as the transmission mode corresponding to the signal quality ranges 121b, 122b and 123b to provide a higher coding rate, a lower level signal modulation manner, fewer antennas, etc.

In brief, after the signal quality distribution map 199 is created by the base station 130, the base station 130 can determine the corresponding transmission mode for each signal transmission range. Accordingly, in this embodiment of the disclosure, when the user equipment 130 moves in the specific field 190, the base station 130 can find the location of the user equipment 130 or the signal transmission range where the location to be visited is located, and timely control the user equipment 130 to be switched to the transmission mode corresponding to the signal transmission range. Detailed description of the above is further provided as follows.

In an embodiment, after the first geological information of the user equipment 110 at present is obtained by the positioning circuit 112, the user equipment 110 can transmit the first geological information to the base station 130 via the transceiver circuit 114. In the scenario of FIG. 1A, if the user equipment 110 is served by the access point 121, the user equipment 110 can forward the first geological information to the base station 130 via the access point 121.

In this case, the base station 130 can predict second geological information (which includes, for example, a second location and/or a second orientation) of the user equipment 110 based on the first geological information. Specifically, since the base station 130 is also able to obtain a plurality of historical geological information previously reported by the user equipment 110, the base station 130 can, for example, execute an extrapolation based on the historical geological information and the first geological information to estimate a next geological information of the user equipment 110 as the second geological information. In other embodiments, the base station 130 may also predict the second geological information of the user equipment 130 based on other similar geological information predicting algorithm, but the disclosure is not limited thereto.

Afterwards, if the first geological information and the second geological information are respectively corresponding to a first signal quality range and a second signal quality range adjacent to each other among the signal quality ranges (e.g., the first location and the second location are located in the first signal quality range and the second signal quality range respectively), the base station 130 can obtain a specific transmission mode corresponding to the second signal quality range. Also, when the the first geological information of the user equipment 110 changes to the second geological information (e.g., the user equipment 110 moving from the first location to the second location), the base station 130 can use a first control signal to control the user equipment 110 to be switched to the specific transmission mode.

Taking FIG. 1B as an example, it is assumed that the first location of the user equipment 110 is currently located at a location P1 (which is located in the signal quality range 121a) and the predicted second location is located at a location P2 (which is located in the signal quality range 121b). In this case, the base station 130 can find the specific transmission mode (e.g., a certain combination of the coding rate, signal modulation manner and the number of antennas) corresponding to the signal quality range 121b (i.e., the second signal quality range).

Afterwards, when the user equipment 110 moves from the location P1 (i.e., the first location) to the location P2 (i.e., the second location), since the base station 130 has already determined the specific transmission mode for the user equipment 110 in advance, the base station 130 can directly control the user equipment 110 to be switched to the specific transmission mode through the first control signal, so that the processor 116 of the user equipment 110 can adopt the corresponding transmission mode in response to its location. In this way, the latency of the user equipment 110 when being switched to the transmission mode can be reduced, so as to improve a transmission performance of the user equipment 110.

In another embodiment, if the first signal quality range where the first location is located and the second signal quality range where the second location is located are respectively corresponding to different access points among the access points 121 to 12M, the base station 130 can perform a handover operation for the user equipment 110 in advance to reduce a communication latency.

Taking FIG. 1B as an example again, it is assumed that the first location of the user equipment 110 is currently located at a location P1' (which is located in the signal quality range 121b) and the predicted second location is located at a location P2' (which is located in the signal quality range 122a). In this case, the base station 130 can find the specific transmission mode (e.g., a certain combination of the coding rate, signal modulation manner, the number of antennas or a codebook of the antenna) corresponding to the signal quality range 122a (i.e., the second signal quality range).

It should be noted that, since the signal quality range 121b is provided by the access point 121 that serves the user equipment 110 and the signal quality range 122a is provided by the access point 122, when the base station 130 predicts that the location P2' (i.e., the second location) will be located in the signal quality range 122a, the base station 130 can execute the handover operation in advance to hand over the user equipment 110 from the access point 121 to the access point 122.

Afterwards, when the user equipment 110 moves from the location P1' (i.e., the first location) to the location P2' (i.e., the second location), since the base station 130 has already determined the specific transmission mode and performed the handover operation for the user equipment 110 in advance, other than directly controlling the user equipment 110 to be switched to the specific transmission mode, the base station 130 can further reduce the latency related to the performed handover operation for the user equipment 110 in advance, so as to improve the transmission performance of the user equipment 110.

Further, in other embodiments, after the user equipment 110 is switched to the specific transmission mode in response to the control of the base station 130, the user equipment 110 can continue to report the measured signal qualities to the base station 130. In this case, if one or more of the signal qualities reported by the user equipment 110 is lower than a signal quality threshold, the specific transmission mode previously determined for the user equipment 110 by the base station 130 may not be suitable for the user equipment 110. Accordingly, the base station 130 can determine another specific transmission mode for the user equipment 110 based on the signal qualities reported by the user equipment 110, and control the user equipment 110 to be switched to said another transmission through a second control signal.

In brief, if the specific transmission mode determined for the user equipment 110 by the base station 130 based on the predicted second geological information leads to a worse signal quality, the base station 130 can separately determine another more suitable specific transmission mode for the user equipment 110 based on the signal qualities, so as to improve the transmission mode of the user equipment 110.

Figure 2:
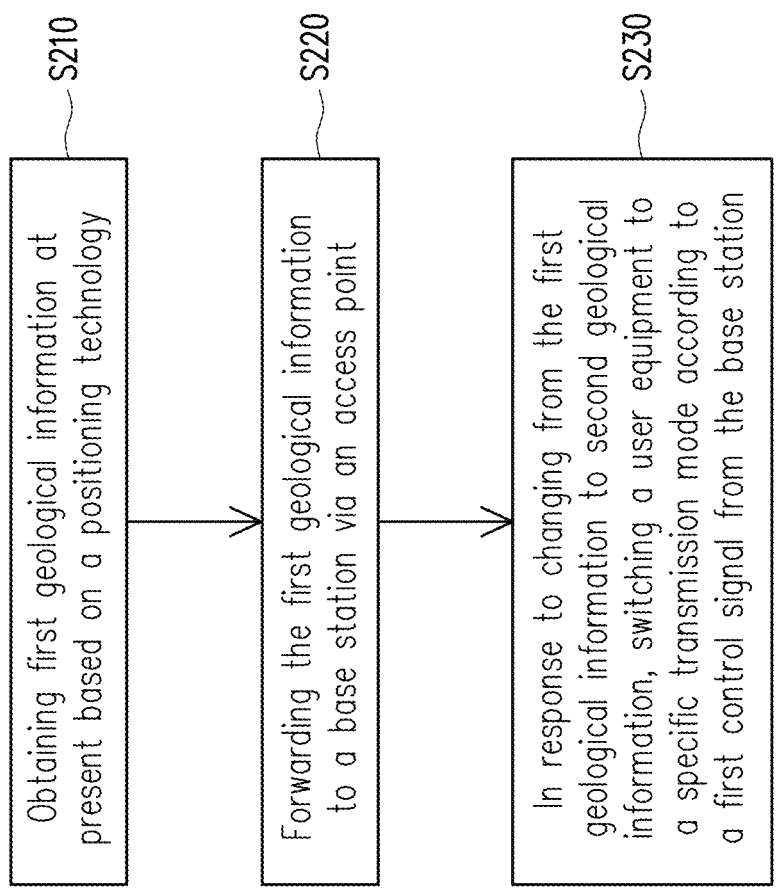
FIG. 2 illustrates a method for switching to a transmission mode according to an embodiment of the disclosure.

See FIG. 2, which illustrates a method for switching transmission modes according to an embodiment of the disclosure. The method of the present embodiment may be executed by the user equipment 110 shown by FIG. 1A and FIG. 1B, and each step of FIG. 2 will be described below with reference to the content shown by FIG. 1A and FIG. 1B.

In various embodiments, the processor 116 can load specific software or program codes in order to execute each step of FIG. 2. First of all, in step S210, the processor 116 of the user equipment 110 (e.g., a head mounted display) can control the positioning circuit 112 to obtain first geological information at present based on a positioning technology. In step S220, the processor 116 of the user equipment 110 can control the transceiver circuit 114 to forward the first geological information to the base station 130 via the access point 121. In step S230, in response to the user equipment 110 changing from the first geological information to second geological information predicted by the base station 130, the processor 116 of the user equipment 110 can switch the user equipment 110 to a specific transmission mode according to a first control signal from the base station 130. Details regarding each step of FIG. 2 may refer to the description in the foregoing embodiment, which is not repeated hereinafter.

To make the concept of the disclosure clearer, several specific application scenarios are further described below.

Figure 3:
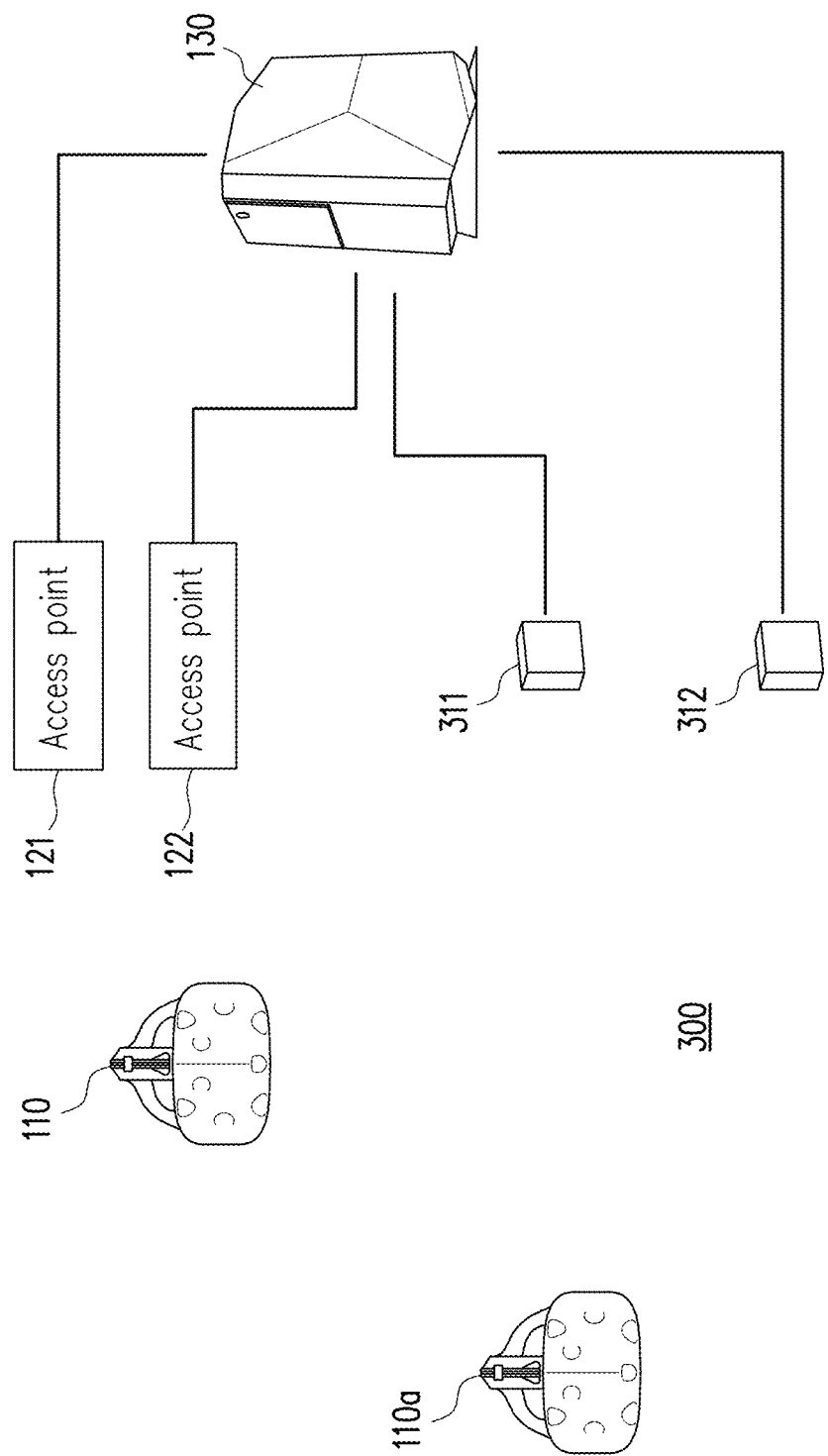
FIG. 3 illustrates an architecture diagram of a communication system according to a first embodiment of the disclosure.

See FIG. 3, which illustrates an architecture diagram of a communication system according to a first embodiment of the disclosure. In this embodiment, a communication system 300 can include user equipments 100 and 100a, access points 121 and 122, beacon transmitting devices 311 and 312 and a base station 130. As shown by FIG. 3, each of the user equipments 100 and 100a is a head mounted display; the beacon transmitting devices 311 and 312 are, for example, devices capable of transmitting a Lighthouse beacon signal; and the base station 130 may be implemented as a personal computer installed with operating systems (e.g., Windows™). As described in the foregoing embodiment, the beacon transmitting devices 311 and 312 can transmit a related beacon signal based on the Lighthouse technology for the user equipments 100 and 100a to detect and accordingly obtain the geological information of their own.

Figure 4:
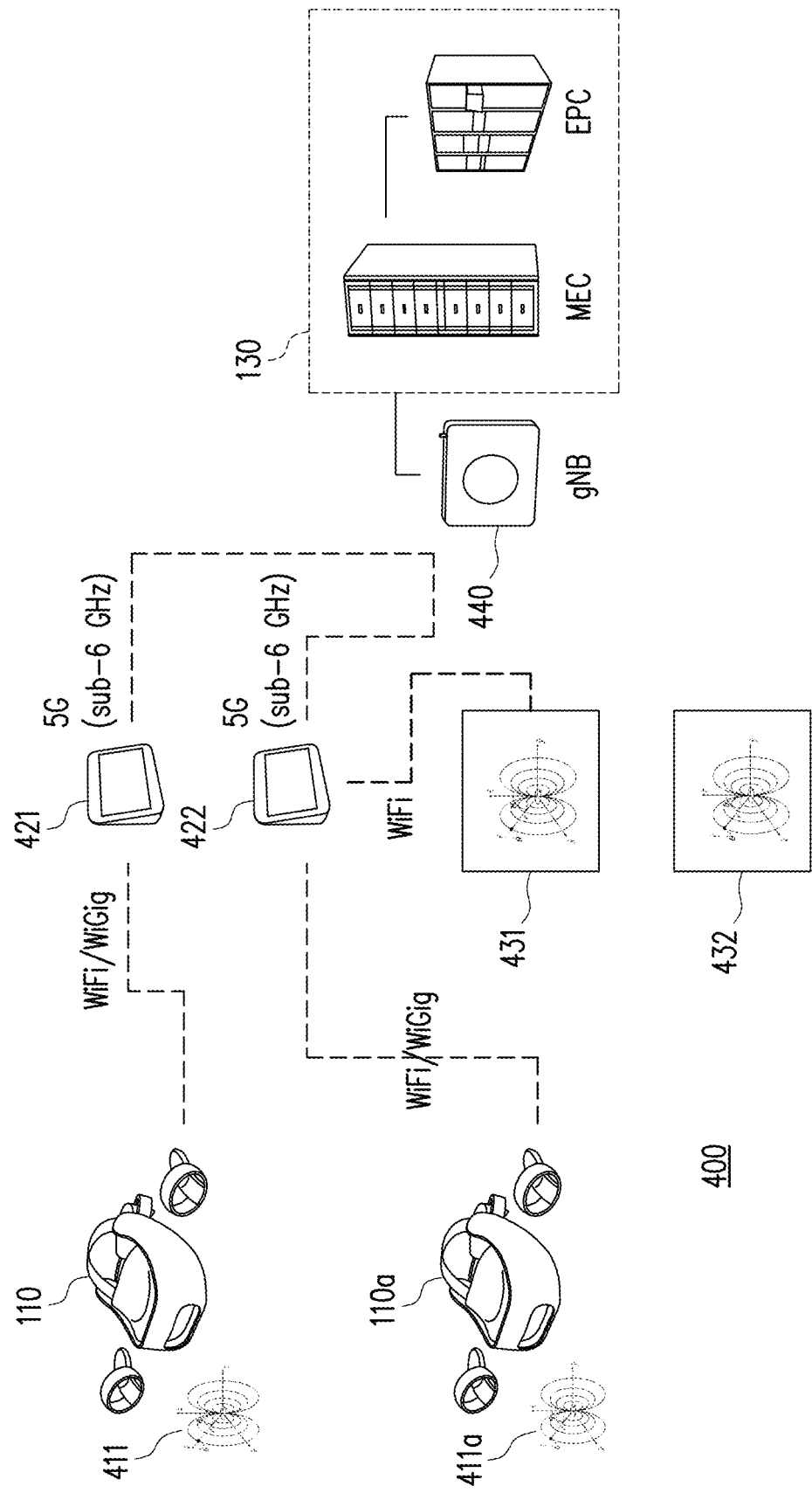
FIG. 4 illustrates an architecture diagram of a communication system according to a second embodiment of the disclosure.

See FIG. 4, which illustrates an architecture diagram of a communication system according to a second embodiment of the disclosure. In this embodiment, a communication system 400 can include user equipments 100 and 100a, near access points 421 and 422, magnetic force transmitting coils 431 and 432, a remote access point 440 and a base station 130. As shown in FIG. 4, the user equipments 100 and 100a can respectively include magnetic force receiving coils 411 and 411a, which can be used to sense the magnetic force transmitting coils 431 and 432 at specific sites in a specific field to obtain the geological information of their own. In addition, the user equipment 110 may be connected to the near access point 421 by technologies including WiFi/WiGig and the like, and the near access point 421 can be connected to the remote access point 440 for managing the near access points 421 and 422 by technologies including 5G and the like. Similarly, the user equipment 110a can be connected to the remote access point 440 through the near access point 422, for example.

In FIG. 4, the remote access point 440 is, for example, a gNB defined in 5G technology, which may be managed by the base station 130 including Multi-access Edge Computing (MEC) and Evolved Packet Core (EPC).

Figure 5:
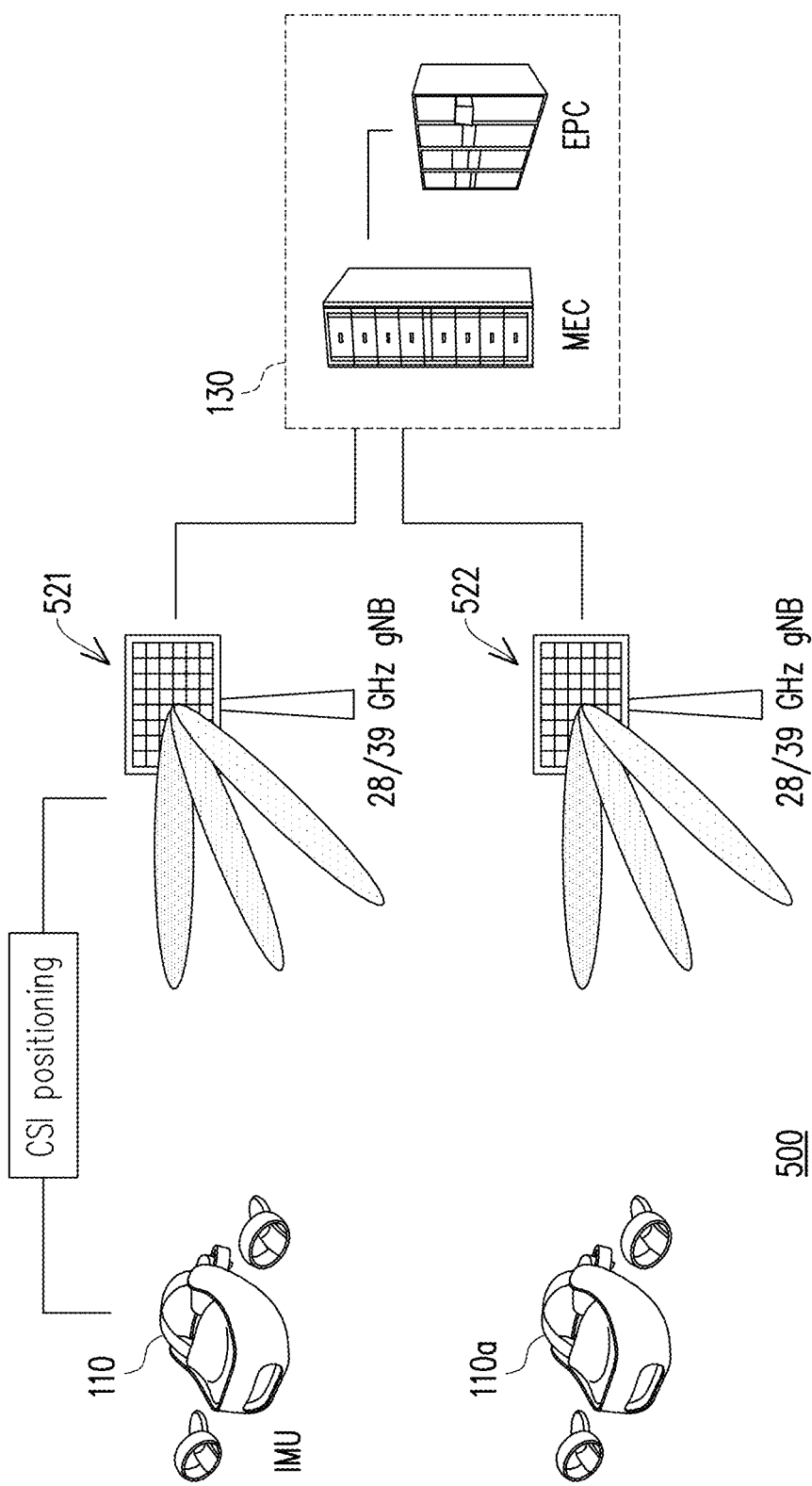
FIG. 5 illustrates an architecture diagram of a communication system according to a second embodiment of the disclosure.

See FIG. 5, which illustrates an architecture diagram of a communication system according to a third embodiment of the disclosure. In this embodiment, a communication system 500 can include user equipments 100 and 100a, access points 521 and 522, and a base station 130. As shown in FIG. 5, the user equipment 110 can include an IMU for performing an inertial navigation technology, and the user equipment 110 can be managed by the access point 521 (e.g., a gNB that adopts 28/39 GHz band). Also, the access point 521 can obtain the location of the user equipment 110 by adopting a channel state information (CSI) positioning technology, but the disclosure is not limited thereto.

In addition, similar to the embodiment of FIG. 4, the base station 130 in FIG. 5 may also be implemented by including the MEC and the EPC, but the disclosure is not limited thereto.

To sum up, in the communication system proposed by the disclosure, the base station can create the signal quality distribution map of the specific field in advance and can determine the transmission mode corresponding to each of the signal quality ranges. Next, after obtaining the first geological information of the user equipment at present, the base station can accordingly predict the second geological information of the user equipment. If the first geological information and the second geological information correspond to the different signal quality ranges, the base station can find the specific transmission mode corresponding to the signal quality range to which the second geological information belongs in advance, and controls the user equipment changed to the second geological information to be switched to the specific transmission mode. In this way, the latency of the user equipment when being switched to the transmission mode can be reduced so as to improve the performance of the user equipment.

In addition, if the signal quality range corresponding to the second geological information being predicted is provided by the other access point, the base station can execute the handover operation for the user equipment in advance to switch the user equipment to the other access points early. Accordingly, the latency of the user equipment due to the handover operation may be further reduced.

Moreover, if the signal quality of the user equipment switched to the specific transmission mode is poor, the base station can separately determine the new specific transmission mode for the user equipment based on the signal quality of the user equipment so as to improve the transmission performance of the user equipment.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A communication system for determining transmission mode based on location, comprising:
   a plurality of access points, disposed within a specific field;
   a base station connected to the access points and managing the access points, wherein the base station receives a plurality of historical measurement reports and a plurality of historical sites corresponding thereto provided by the access points and creates a signal quality distribution map of the specific field according to the historical measurement reports and the historical sites, the signal quality distribution map comprising a plurality of signal quality ranges, each of the signal quality ranges corresponding to one of a plurality of transmission modes;
   a user equipment, located in the specific field, and served by a first access point among the access points;
   wherein the base station is configured for:
      obtaining first geological information of the user equipment at present, and predicting second geological information of the user equipment based on the first geological information;
      in response to the first geological information and the second geological information respectively corresponding to a first signal quality range and a second signal quality range adjacent to each other among the signal quality ranges, obtaining a specific transmission mode corresponding to the second signal quality range from the transmission modes; and
      in response to the user equipment changing from the first geological information to the second geological information, using a first control signal to control the user equipment to be switched to the specific transmission mode.

2. The communication system according to claim 1, further comprising: a plurality of first user equipments served by the access points, the first user equipments being configured to provide the historical measurement reports and the historical sites corresponding to the historical measurement reports to the access points, wherein the historical measurement reports comprise a plurality of signal qualities measured by the first user equipments.

3. The communication system according to claim 1, wherein in response to the first signal quality range and the second signal quality range respectively corresponding to the first access point and a second access point among the access points, the base station is further configured to perform a handover operation after predicting the second geological information so as to hand over the user equipment from the first access point to the second access point.

4. The communication system according to claim 1, wherein the first geological information comprises a first location and orientation of the user equipment at present, and the user equipment obtains the first geological information of the user equipment based on a positioning technology and forwards the first geological information to the base station via the first access point, wherein the first geological information comprises the first location and orientation of the user equipment at present, and the user equipment comprises an inertial measurement unit which obtains the first geological information of the user equipment based on an inertial navigation technology.

5. The communication system according to claim 4, further comprising: a beacon transmitting device, configured to transmit a beacon signal,
wherein the positioning technology executed by the user equipment comprises a Lighthouse technology, which is used to obtain the first geological information of the user equipment based on the beacon signal.

6. The communication system according to claim 1, wherein the first geological information comprises a first location of the user equipment at present, the specific field comprises a plurality of specific sites, the specific sites comprise a first specific site disposed with a first location tag, and the user equipment determines that the first location of the user equipment is located at the first specific site in response to obtaining the first location tag.

7. The communication system according to claim 6, wherein the user equipment comprises an image capturing element, and the user equipment captures the first location tag through the image capturing element and performs an image recognition operation on the first location tag to determine that the first location of the user equipment is located at the first specific site.

8. The communication system according to claim 6, wherein the first location tag is a quick response code indicating the first specific site.

9. The communication system according to claim 6, wherein the first location tag disposed at the first specific site has a magnetic force transmitting coil, the user equipment comprises a positioning circuit configured for executing the positioning technology, the positioning circuit comprises a magnetic force receiving coil, and the user equipment determines that the first location of the user equipment is located at the first specific site in response to the magnetic force transmitting coil sensed by the magnetic force receiving coil.

10. The communication system according to claim 1, wherein the base station is stored with a plurality of historical geological information previously reported by the user equipment, and executes an extrapolation based on the historical geological information and the first geological information to estimate a next geological information of the user equipment as the second geological information.

11. The communication system according to claim 1, wherein after the user equipment is switched to the specific transmission mode, the user equipment further reports a plurality of signal qualities to the base station, and in response to all the signal qualities being lower than a signal quality threshold, the base station further determines another specific transmission mode based on the signal qualities, and controls the user equipment to be switched to said another specific transmission mode.

12. A head mounted display located in a specific field and served by a first access point in the specific field, the first access point being managed by a base station, wherein the head mounted display comprises:
a positioning circuit, obtaining first geological information of the head mounted display at present based on a positioning technology;
a transceiver circuit, forwarding the first geological information to the base station via the first access point;
a processor, coupled to the positioning circuit and the transceiver circuit, and configured for:
in response to the head mounted display changing from the first geological information to second geological information, switching to a specific transmission mode according to a first control signal from the base station.

13. The head mounted display according to claim 12, wherein the specific field has a signal quality distribution map, the signal quality distribution map comprising a plurality of signal quality ranges, each of the signal quality ranges corresponding to one of a plurality of transmission modes;
wherein the first geological information and the second geological information respectively correspond to a first signal quality range and a second signal quality range adjacent to each other among the signal quality ranges, and the specific transmission mode among the transmission modes corresponds to the second signal quality range.

14. The head mounted display according to claim 13, wherein in response to the first signal quality range and the second signal quality range respectively corresponding to the first access point and a second access point among the access points, after forwarding the first geological information, the processor is further configured to hand over the head mounted display from the first access point to the second access point in response to a handover operation performed by the base station.

15. The head mounted display according to claim 13, wherein after the head mounted display is switched to the specific transmission mode, the head mounted display further reports a plurality of signal qualities via the first access point, and in response to all the signal qualities being lower than a signal quality threshold, the processor is further switched to another specific transmission mode according to a second control signal from the base station.

16. The head mounted display according to claim 12, wherein the first geological information comprises a first location and orientation of the head mounted display at present, the positioning technology comprises a Lighthouse technology, and the positioning circuit executes the Lighthouse technology to obtain the first geological information of the head mounted display based on a beacon signal in the specific field.

17. The head mounted display according to claim 12, wherein the first geological information comprises a first location of the head mounted display at present, the specific field comprises a plurality of specific sites, the specific sites comprise a first specific site disposed with a first location tag, and the positioning circuit determines that the first location of the head mounted display is located at the first specific site in response to obtaining the first location tag.

18. The head mounted display according to claim 17, wherein the positioning circuit comprises an image capturing element, and the positioning circuit captures the first location tag through the image capturing element and performs an image recognition operation on the first location tag to determine that the first geological information of the head mounted display is located at the first specific site, wherein the first geological information comprises the first location and orientation of the head mounted display at present, and the positioning circuit comprises an inertial measurement unit which obtains the first geological information of the head mounted display based on an inertial navigation technology.

19. The head mounted display according to claim 17, wherein the first location tag is a quick response code indicating the first specific site.

20. The head mounted display according to claim 17, wherein the first location tag disposed at the first specific site has a magnetic force transmitting coil, the positioning circuit comprises a magnetic force receiving coil, and the processor determines that the first location of the head mounted display is located at the first specific site in response to the magnetic force transmitting coil sensed by the magnetic force receiving coil.

* * * * *